United States Patent [19]
Burns et al.

[11] Patent Number: 5,245,466
[45] Date of Patent: Sep. 14, 1993

[54] OPTICAL MATTER

[75] Inventors: Michael M. Burns, Arlington; Jean-Marc Fournier, Belmont; Jene A. Golovchenko, Lexington, all of Mass.

[73] Assignee: President and Fellows of Harvard University and Rowland Institute, Cambridge, Mass.

[21] Appl. No.: 773,980

[22] Filed: Oct. 8, 1991

Related U.S. Application Data

[63] Continuation of Ser. No. 568,347, Aug. 15, 1990, abandoned.

[51] Int. Cl.$^5$ .............................................. G02B 26/00
[52] U.S. Cl. ...................... 359/296; 372/27; 372/69
[58] Field of Search ............ 350/359, 362, 363, 162.2; 356/303, 334; 372/109, 27, 69; 359/296

[56] References Cited

U.S. PATENT DOCUMENTS 4,451,412  5/1984  Loiseaux et al.
4,627,689  12/1986  Asher .................. 350/362
4,632,517  12/1986  Asher .................. 350/362

OTHER PUBLICATIONS

Exchange of letters between present inventors and Chowdhury et al., which appeared in Science, 252, May 25, 1991.
"All-Optical Logic Gates Using Colloids," A. H. Chowdhury et al., Microwave and Optical Technology Letters, vol. 1, No. 5, pp. 175-178, Jul. 1988.
"Bifurcation in Degenerate Four-Wave Mixing in Liquid Suspensions of Microspheres," D. Rogovin et al., Physical Review Letters, vol. 54, No. 20, pp. 2222-2225, May 20, 1985.
"Radiation Pressure as a Technique for Manipulating the Particle Order in Colloidal Suspensions", Ackerson et al., Faraday Discuss. Chem. Soc., 83, 309 (1987).
"Optical Binding", Burns et al., Physical Review Letters, 63, 1233 (1989).
"'Optical Matter' Emerges Under Laser", Amato, Science News, 136, 212 (1989).
"Scientists Bind Matter with Light", Cromie, Harvard University Gazette, 1, Oct. 13, 1989.
"Matter rides on ripples of light", Law, Science, 30, Nov. 18, 1989.
"Atoms Bound Together by Light", The New York Times, C17, Oct. 31, 1989.
"The light that binds", Fisher, Popular Science, Jan. 24, 1990.
"Matter Bound by Light", Inside R & D, 18, 2, Oct. 25, 1989.
"Is There Anything A Laser Can't Do?", Business Week, 157, Oct. 30, 1989.
"Force Fields of Laser Light Bind Molecules in a Remarkable Discovery at Harvard", Wheeler, The Chronicle of Higher Education, A4, Oct. 25, 1989.
"Laser-Induced Freezing", Chowdhury et al., Physical Review Letters, 55, 833, (Aug. 19, 1985).

(List continued on next page.)

Primary Examiner—Léon Scott, Jr.
Attorney, Agent, or Firm—Choate, Hall & Stewart

[57] ABSTRACT

Arrays of extended crystalline and non-crystalline structures are created using light beams coupled to microscopic polarizable matter. Polarizable matter adopts the pattern of an applied, patterned light intensity distribution. Further, polarizable matter itself scatters applied light, resulting in production of a stable, bound configuration of that matter. Alternatively, polarizable matter can simultaneously adopt the pattern of an applied patterned light intensity while the incident light scattered by the matter itself acts further to organize the matter. Dielectric, semiconductor, metal, molecular, atomic and biological matter can be organized using light to fabricate numerous devices including mechanical and optical filters, self-organizing Bragg lasers, templates for epitaxy, photonic semiconductors, optical components including holograms and diffractive optical elements as well as two dimensional membranes of living biological cells.

50 Claims, 16 Drawing Sheets

OTHER PUBLICATIONS

"Acceleration And Trapping Of Particles By Radiation Pressure", Ashkin, Physical Review Letters, 24, 156 (Jan. 26, 1970).

"Optical Levitation of Liquid Drops by Radiation Pressure", Ashkin, Science, 187, 1073 (Mar. 21, 1975).

"Applications of Laser Radiation Pressure", Ashkin, Science, 210, 1081 (Dec. 5, 1980).

"Observation of a single-beam gradient force optical trap for dielectric particles", Ashkin et al., Optics Letters, 11, 288, (May, 1986).

"Four-wave mixing in an artificial Kerr medium", Smith et al., Optics Letters, 6, 284 (Jun., 1981).

"A Theoretical And Experimental Study Of The Stable Equilibrium Positions Of Spheres Levitated By Two Horizontal Laser Beams", Roosen, Optics Communications, 21, 189 (Apr., 1977).

"Intermolecular interactions in the presence of an intense radiation field", Thirunamachandran, Molecular Physics, 40, 393 (Jun. 10, 1980).

"Single Colloidal crystals", Clark et al., Nature, 281, 57 (Sep. 6, 1979).

"Crystalline Colloidal Bragg Diffraction Devices: the Basis for a New Generation of Raman Instrumentation", Asher et al., Spectroscopy, 1, 26 (1986).

"Experimental Observation of Two Stage Melting in a Classical Two-Dimensional Screened Coulomb System", Murray et al., Physical Review Letters, 58, 1200 (Mar. 23, 1987).

"Trapping of Atoms by Resonance Radiation Pressure", Ashkin, Physical Review Letters, 40, 729 (Mar. 20, 1978).

"Experimental Observation of Optically Trapped Atoms", Chu et al. Physical Review Letters, 57, 314 (Jul. 21, 1986).

"Continuous Stopping and Trapping of Neutral Atoms", Bagnator et al., Physical Review Letters, 58, 2194 (May 25, 1987).

"Trapping of Neutral Sodium Atoms with Radiation Pressure", Raab et al., Physical Review Letters, 59, 2631 (Dec. 7, 1987).

"Light Traps Using Spontaneous Forces", Pritchard et al., Physical Review Letters, 57, 310 (Jul. 21, 1986).

"Inhibited Spontaneous Emission in Solid-State Physics and Electronics", Yablonovitch, Physical Review Letters, 58, 2059 (May 18, 1987).

"Phototonic Bank Structure: The Face-Centered-Cubic Case", Yablonovitch et al., Physical Review Letters, 63, 1950 (Oct. 30, 1989).

"Diffractive optical elements for use in infrared systems", Swanson et al., Optical Engineering, 28, 605 (Jun. 1989).

"Coherent laser addition using binary phase gratings", Leger et al. Applied Optics, 26, 4391 (Oct. 15, 1987).

"Optical Trapping and Manipulation of Viruses and Bacteria", Ashkin et al., Science, 235, 1517 (Mar. 20, 1987).

"Optical trapping and manipulation of single cells using infrared laser beams", Ashkin et al., Nature, 330, 769 (Dec. 24/30, 1987).

"Compliance of bacterial flagella measured with optical tweezers" Block et al., Nature 338, 514 (Apr. 6, 1989).

"Use of a laser-induced optical force trap to study chromosome movement on the mitotic spindle", Berns et al., Proceedings Of The National Academy of Sciences, 86, 4539 (Jun., 1989).

"Internal cell manipulation using infrared laser traps", Ashkin et al., Proceedings Of The National Academy of Sciences, 86, 7914 (Oct., 1989).

"Localization of Atoms in a Three-Dimensional Standing Wage", Westbrook et al., Physical Review Letters, 65, 33 (Jul. 2, 1990).

"Observation of Channeling of Atoms in the Three-Dimensional Interference Pattern of Optical Standing Waves", Bigelow et al., Physical Review Letters, 65, 29 (Jul. 2, 1990).

OPTICAL MATTER

This is a continuation of copending application Ser. No. 07/568,347 filed on Aug. 15, 1990 now abandoned.

BACKGROUND OF THE INVENTION

The invention relates to the organization of matter using light.

Matter can be organized, manipulated and transported using intense light beams under carefully controlled conditions. Using this method, matter can be organized in diverse configurations more quickly than with conventional photographic and photolithographic methods.

SUMMARY OF THE INVENTION

According to an aspect of the invention, matter is organized in a selected pattern by providing mobile, polarizable matter to be organized, and directing multiple light beams on the matter to create a particular controllable intensity pattern according to which the matter is organized in an array.

In another aspect of the invention, matter is mutually bound and organized by light scattered by the matter itself from the incident light.

In another aspect of the invention, matter is organized simultaneously by both a controllable light intensity pattern and light scattered by the matter itself from the incident intensity pattern.

In preferred embodiments of the invention, the matter to be organized can be solid or fluid and can include spherical or non-spherical polystyrene, plastic, dielectric, semiconductor, metal, atomic or molecular particles and biological material. Non-spherical particles can be oriented and condensed into more highly ordered materials than occur naturally.

In preferred embodiments of the invention, any light with a coherence length longer than the size of the array in which matter is to be organized can be used. Laser light from gas, dye, diode or solid state lasers of varying wavelengths including infrared provides a convenient source of intense light with a long coherence length. Array design can be effected by carefully controlling angle of incidence, geometry, frequency, intensity, polarization, focal properties and mutual phases of the incident light beams to produce the desired array pattern. Illumination by multiple light beams produces periodic arrays with single- or multi-unit bases. A periodic arrays can also be produced by illuminating the matter with appropriate numbers and configurations of beams (for example five beams equiangularly incident on the matter). An array of a selected symmetry can be produced by choosing the appropriate number and geometry of the light beams. The intensity pattern provides the pattern into which the matter is organized.

In other aspects of the invention, apparatus for inducing crystallization or for binding matter is provided. Such apparatuses include a laser and an arrangement of mirrors and lenses for splitting and/or focussing laser light on a sample cell containing matter to be organized or bound.

Light beams escaping from the array region contain information about the organized matter that can be used to monitor and characterize the new material as it is being made by viewing or photographing an image of the material or viewing diffraction spots from the organized matter.

In preferred embodiments, the arrays of matter so organized can be preserved in the absence of a sustaining light field by in-situ freezing, hardening or curing of a surrounding medium.

According to other aspects of the invention, the construction of matter organization patterns with light is exploited for fabrication of various useful devices. Mechanical filters can be constructed in which the spacing between elements of the organized matter serves to selectively distinguish between different size particles or organisms. Optical filters can also be constructed in which the spacing determines which wavelengths of light are transmitted or reflected. Such a filter can be made permanent or continuously tuned during use. Semiconductors and superconductors can be epitaxially grown on templates formed by the incident light beams. Self-organizing Bragg lasers may be constructed by providing a pump laser to form a regular array of intensity maxima along with fluorescent particles which are organized and pumped by the intensity maxima to produce a laser. New materials with diverse properties, such as photonic semiconductors, materials exhibiting an optical bandgap where optical modes, spontaneous emission and zero point fluctuations are absent can be fabricated using matter organization patterns.

DESCRIPTION OF THE PREFERRED EMBODIMENT

Figure 1:
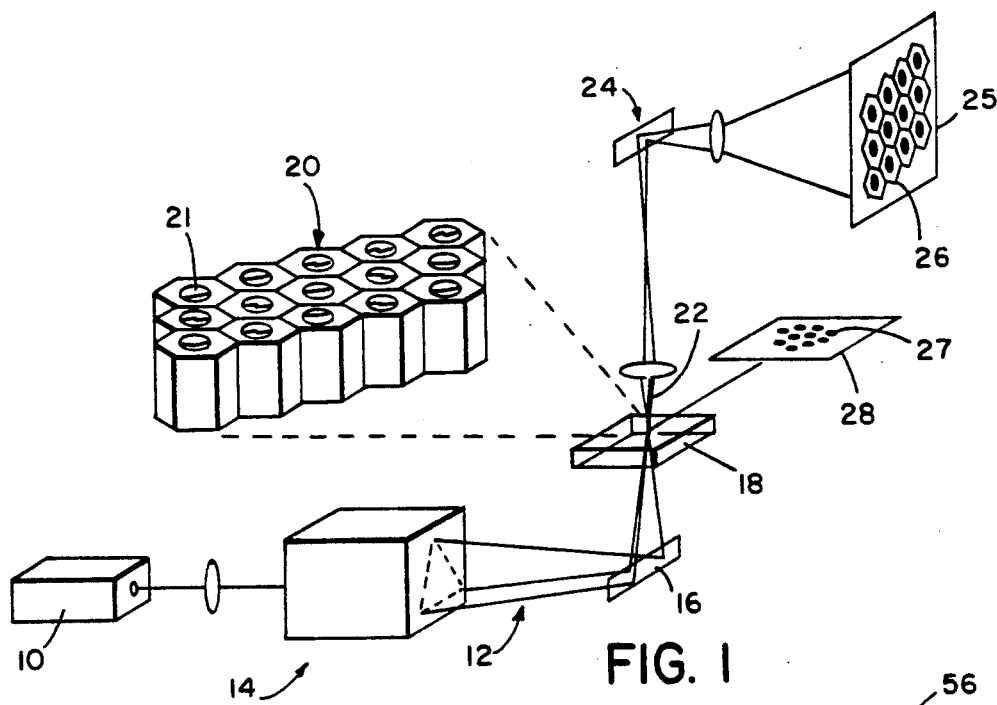
FIG. 1 is a schematic illustration of an apparatus for optical crystallization.

An apparatus for inducing crystallization in optical standing waves is schematically illustrated in FIG. 1. An argon ion laser 10 delivering up to 10 watts of power at a wavelength of 5145 Å supplies incident light which is focussed and split into multiple beams 12 by an arrangement of reflecting and partially reflecting mirrors and lenses 14. Multiple beams 12, with carefully controlled intensity, polarization, focal properties and mutual phases are reflected from folding mirror 16 and brought to a common focus on sample cell 18 which contains the matter to be organized. Interfering light beams therein generate optical standing wave fields which serve as templates, shown in expanded view 20, by which order will be imposed. Three beams are shown converging on the sample cell in FIG. 1; however, between two and five beams have been used successfully to induce crystallization.

Sample cell 18 is a transparent chamber containing a suspension of micron size plastic spheres 21 in water. Spheres 21 are dispersed in the liquid by ultrasonic shaking and by screening the monopolar charges on the spheres with a buffer salt such as $10^{-4}$M phosphite buffer dissolved in the water. Two fused silica plates, make up the front (bottom) and back (top) surface of the cell, through which the light enters and exits, respectively. The cell is mounted so the plates are in the horizontal plane with light entering from below to minimize convective liquid flow adverse effects.

After passing through the sample cell 18, the transmitted light beams serve the added purpose of providing a monitor of both the standing wave field and accumulated condensed optical matter phases. Transmitted light is collected in projection optics 24, essentially constituting a projection microscope which ultimately presents a focused image 26 on screen 25 for viewing or photographing.

A second method of monitoring processes occurring in the sample cell is by directly viewing the angular distribution of transmitted light with no additional optical elements. The formation of large arrays of ordered material in the cell causes strong diffraction of the incident light beams. The diffraction spots 27 on screen 28 thus observed also characterize the newly formed material and can provide comprehensive quantitative information about both static and dynamical properties of material in cell 18.

Figure 2:
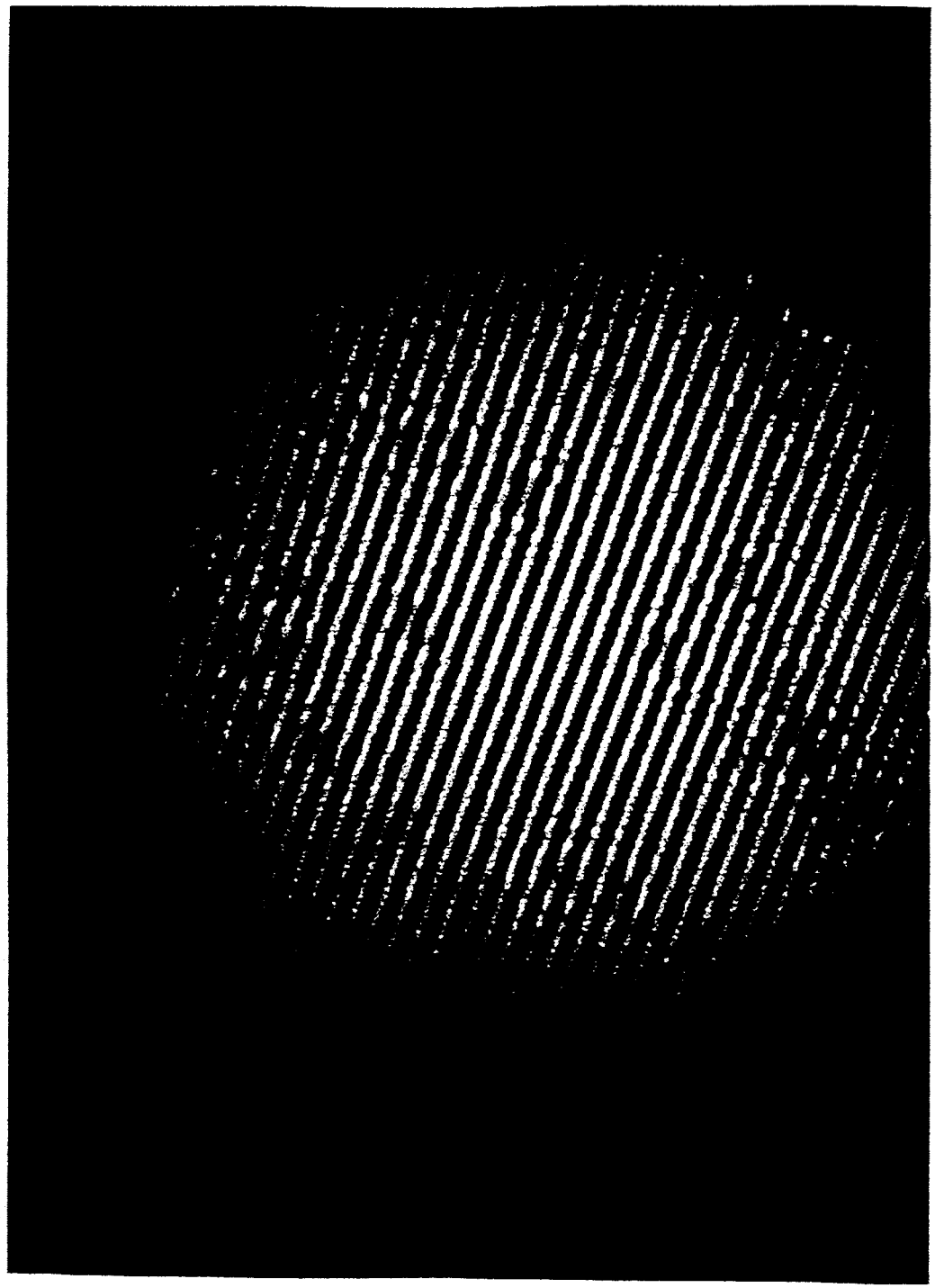
FIG. 2 shows an intensity pattern produced in a sample cell by two incident beams.
Figure 3:
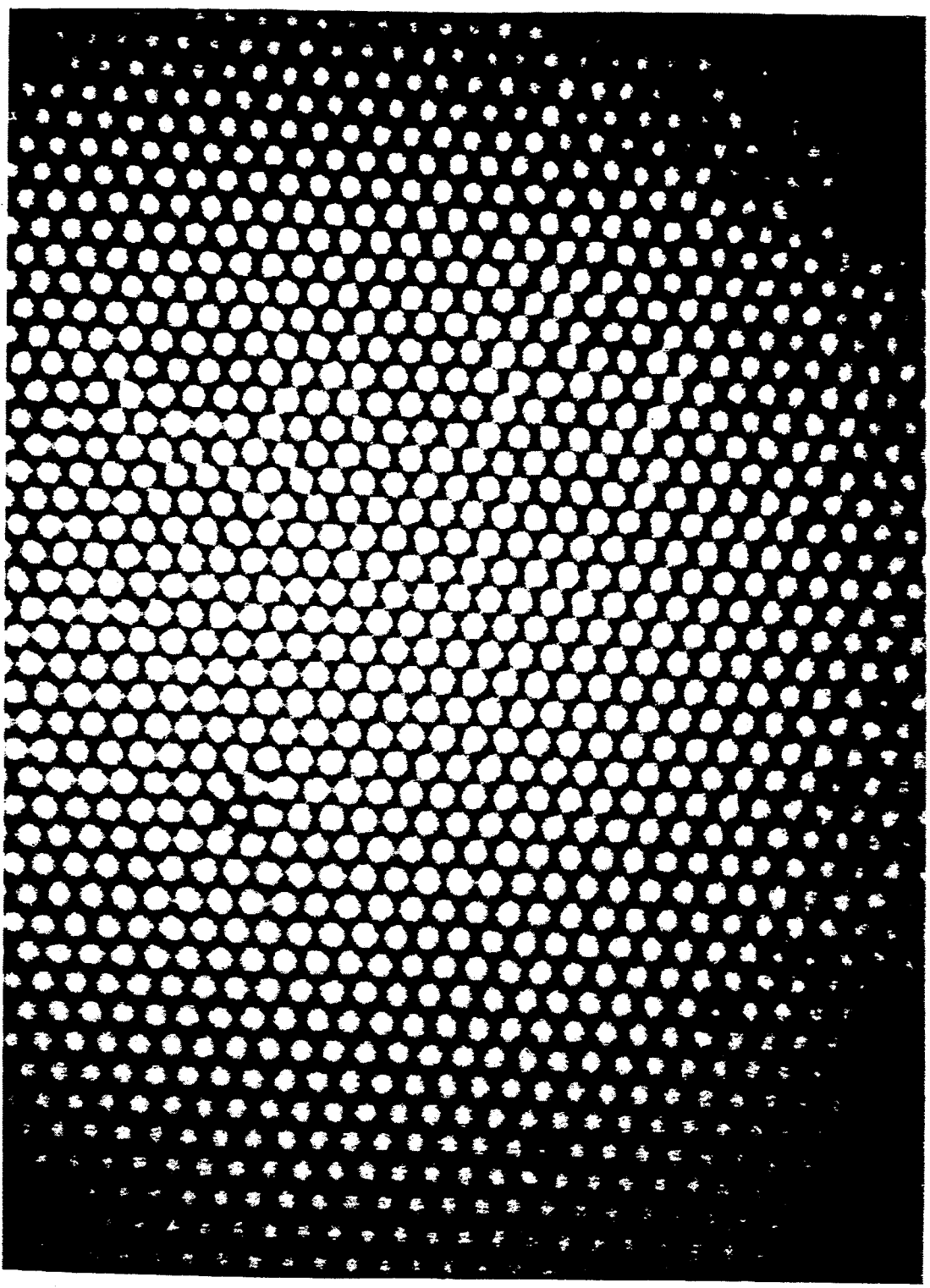
FIG. 3 shows an intensity pattern produced in a sample cell by three equiangularly incident beams.
Figure 4:
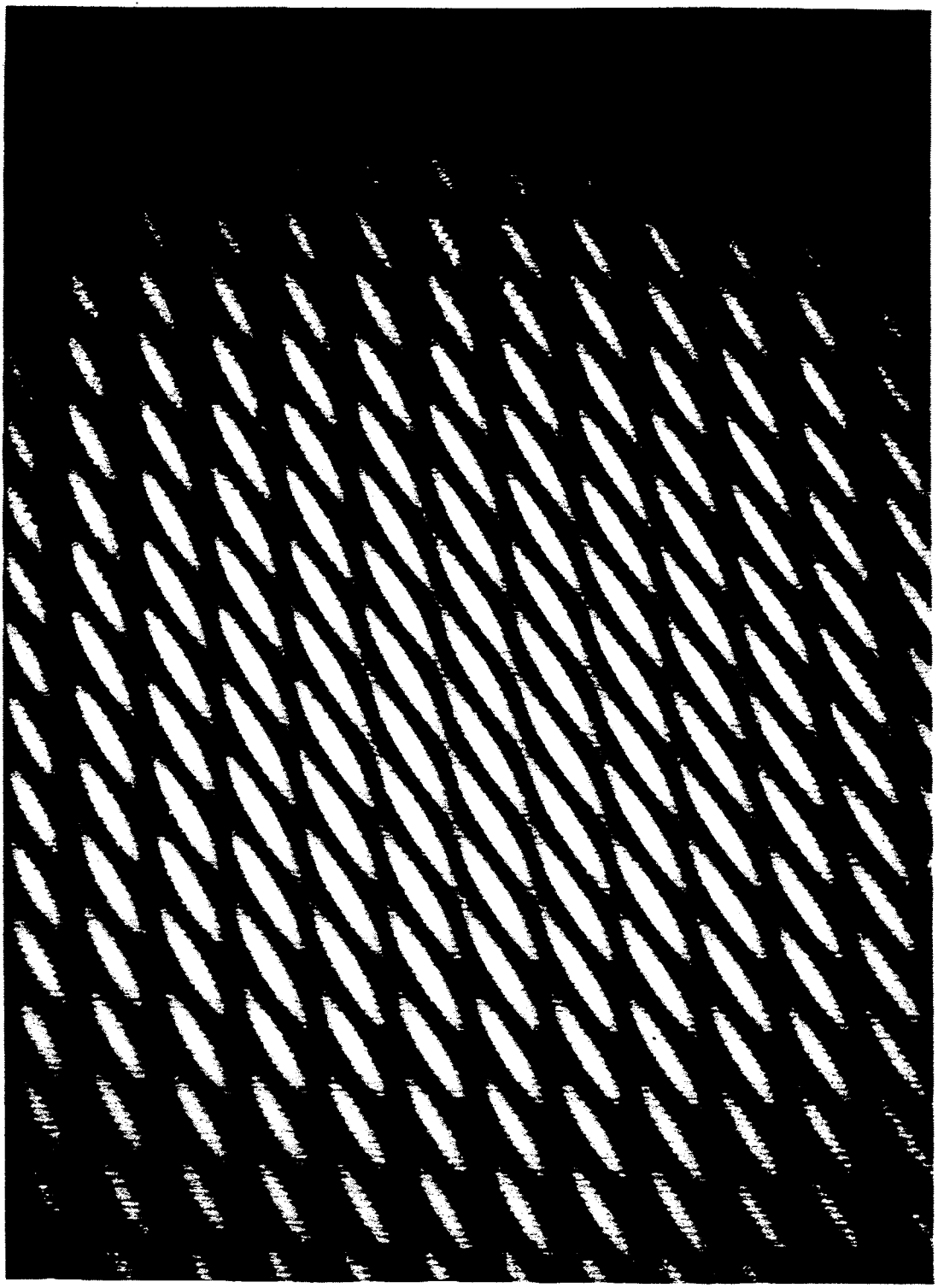
FIG. 4 shows an intensity pattern produced in a sample cell by three nonequiangularly incident beams.

FIGS. 2, 3, and 4 show images of various standing wave intensity fields at the back of an empty cell.

The first, FIG. 2, is formed by convergence of two incident beams on the sample. The spacing between intensity maxima, which form long parallel planar optical traps, is given by $$D = \lambda/2\sin\frac{\theta}{2} \qquad (1)$$

where $\theta$ is the convergence angle between the incident beams and $\lambda$ is the wavelength of the incident light. In a preferred embodiment, D is four microns.

FIG. 3 shows a standing wave image formed by three equiangularly convergent beams. A lattice of rod-like intensity maxima extends through the cell. Finally, by relaxing the geometric requirement of equiangular convergence, a lattice of elongated intensity maxima is formed by three beams as shown in FIG. 4.

From the principle of superposition, the time averaged spatial field intensity in the sample cell general form is a sum of the individual incident beam intensities plus a set of periodic interference terms which provide the intensity modulations shown in FIGS. 2–4. The spatial periodicity of each interference term is determined by linear combinations of the (linearly independent) differences of incident wave vectors which form the reciprocal lattice basis for the real-space periodicities. If the required reciprocal lattice vectors are less than three and linearly independent, a periodic intensity space lattice results. If there are more (i.e. if there are more than four incident beams), the real-space intensity distribution will, in general, be aperiodic. Finally, each interference term in the intensity sum will be multiplied by a factor dependent on the incident beam intensities and polarizations and each will have a phase that depends on the relative phases of the incident beams (which are also experimentally adjustable parameters.)

The mechanism by which dielectric matter may be trapped in optical standing waves ultimately derives from the most fundamental considerations of electromagnetism, (J. A. Stratton, Electromagnetic Theory, McGraw-Hill, New York, 1940; J. D. Jackson, Classical Electrodynamics, Second edition, J. Wiley & Sons, New York, 1975). From a microscopic view, the Lorentz force equation summarizes the most elementary aspect of the field-matter interaction. The Lorentz force on a body with a distribution of charge density $\rho(t)$ and current density $j(t)$ in volume V immersed in electric and magnetic field strengths $\vec{E}$ and $\vec{B}$ is $$\int (\rho(t)\vec{E}(t)+\vec{j}(t)\times\vec{B}(t))dV \qquad (2)$$

Static forces on the body may result from high frequency undulations of $\vec{E}$ and $\vec{B}$ because $\rho(t)$ and $\vec{j}(t)$ generally oscillate sympathetically in time with these fields. A time average of the Lorentz force over a cycle of the fields thus yields a net static component of force on the body. The simplest application of these ideas is to a system of charge e bound to an oppositely charged central heavy mass to form an harmonic oscillator of natural frequency $\omega_0$. One then finds for the time averaged force $$F = \frac{1}{2}\alpha\nabla E^2, \quad \alpha = \frac{e^2}{m(\omega_0^2 - \omega^2)} \qquad (3)$$

which can most conveniently be derived from a potential energy function $$W = -\tfrac{1}{4}\alpha E^2 \qquad (4)$$

where $\alpha$ is the oscillator polarizability at the optical frequency $\omega$, and m is the mass of the oscillating bound charge.

For macroscopically dense matter, the formulation of the physics of forces is somewhat more involved, L. D. Landau, et al., Electrodynamics of Continuous Media (Second edition), (Pergammon Press, Oxford, 1984); J. P. Gordon, Phys. Rev. A 8, 14 (1973); H. A. Haus, et al., Electromagnetic Fields and Energy, (Prentice Hall, New Jersey, 1989); P. Penfield, Jr., et al., Electrodynamics of Moving Media, (MIT Press, Cambridge, 1967); F. N. H. Robinson, Phys. Rep. 16C, 314 (1975); I. Brevik, Phys. Rep. 52, 133 (1979); in part because $\vec{E}$ and $\vec{B}$ fields that appear in Maxwell's equations in dense matter are now usually taken to be fields averaged over the atomic scale fluctuations of the system with the electromechanical degrees of freedom of the charges hidden in dielectric and magnetic response functions. In addition, the elastic properties of the system also play an important role and must be treated. It is possible in this description, at least at low enough frequencies, and in the absence of dissipation, to deduce the reaction forces necessary to keep dielectric objects in spatial equilibrium from the principle of virtual work. Using this formalism and perturbation theory for the scattered fields one finds for a small dielectric sphere of radius "a" and dielectric function $\epsilon$, in a fluid of dielectric function $\epsilon_2$, the force is given by $$F = \frac{1}{2} \frac{\epsilon_1 - \epsilon_2}{\frac{\epsilon_1}{\epsilon_2} + 2} a^3 \nabla E^2 \tag{5}$$

which is derivable from a potential energy function $$W = -\frac{1}{2} \frac{\epsilon_1 - \epsilon_2}{\frac{\epsilon_1}{\epsilon_2} + 2} a^3 E^2 \tag{6}$$

One may estimate the effectiveness of the standing wave intensity modulations in trapping dielectric objects by comparing the minimum energy of interaction in equation (6) with the thermal energy kT. The latter has the value of 26 millielectron volts at room temperature and for experiments the trap depths can be made of the order of electron volts when light power of several watts is focused down to areas of order several hundred square microns. Under these conditions strong trapping in the vicinity of intensity maxima is expected, if there is a mechanism for dissipating the sphere kinetic energy, supplied in a preferred embodiment by the viscosity of the fluid in the cell. If the material (or voids in the fluid) has a refractive index less than the refractive index of the fluid, they will be trapped at intensity minima.

When a dilute suspension of spheres in the cell 18 is allowed to settle, and the laser beams are turned on, at first no spheres are seen in projected image 26 of the top of the cell. Over a period of a few seconds, the radiation pressure from the incident laser light (typically 100,000 Watts/cm² intensity) lifts the spheres 21 from the bottom to the top of the cell, where they collect at the positions of the intensity maxima of the standing wave field 20, and are imaged (along with the standing wave field) in the projection system.

Figure 5:
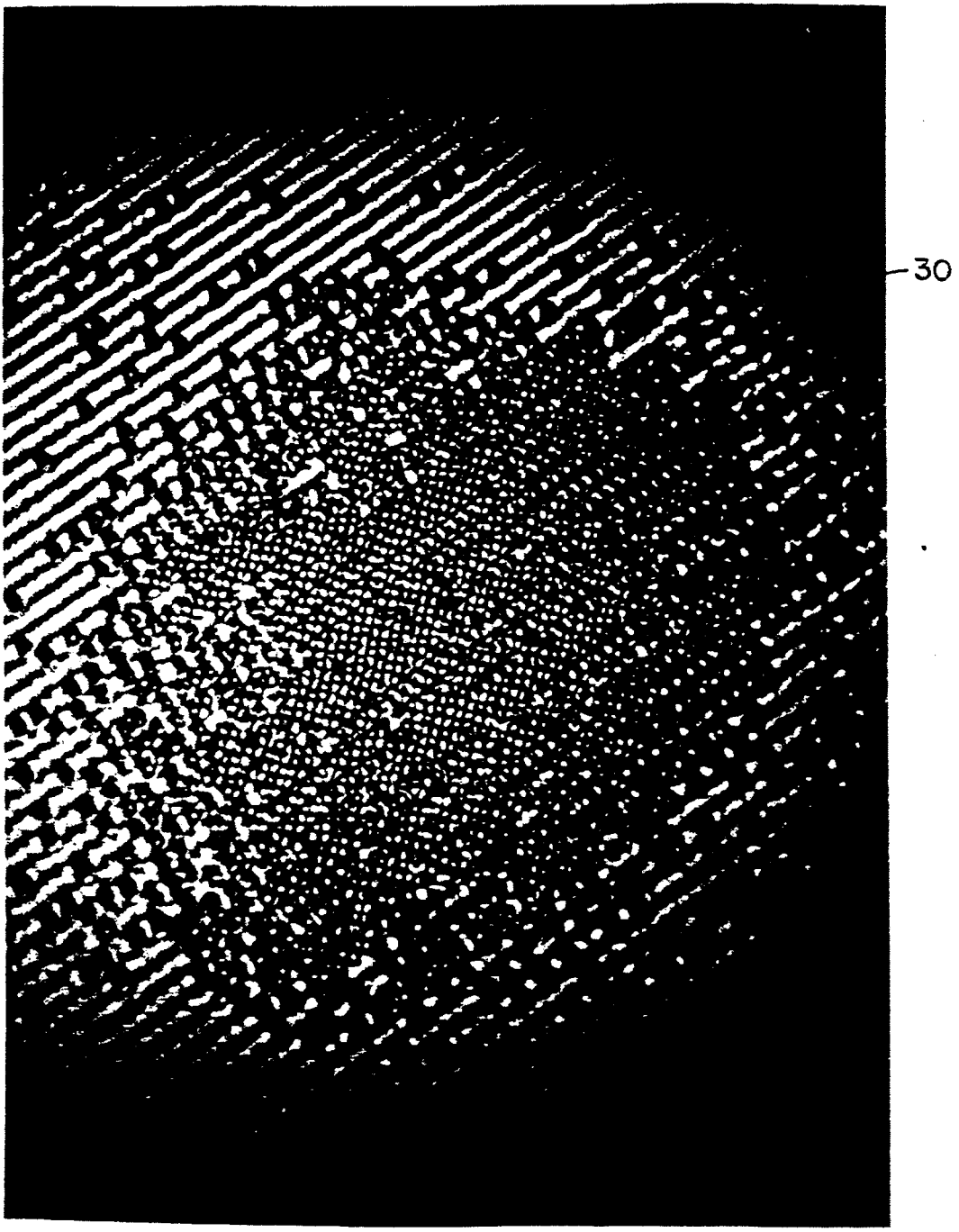
FIG. 5 shows spheres (3.4 micron diameter) distributed by the gradient force in the intensity pattern of FIG. 2.
Figure 6:
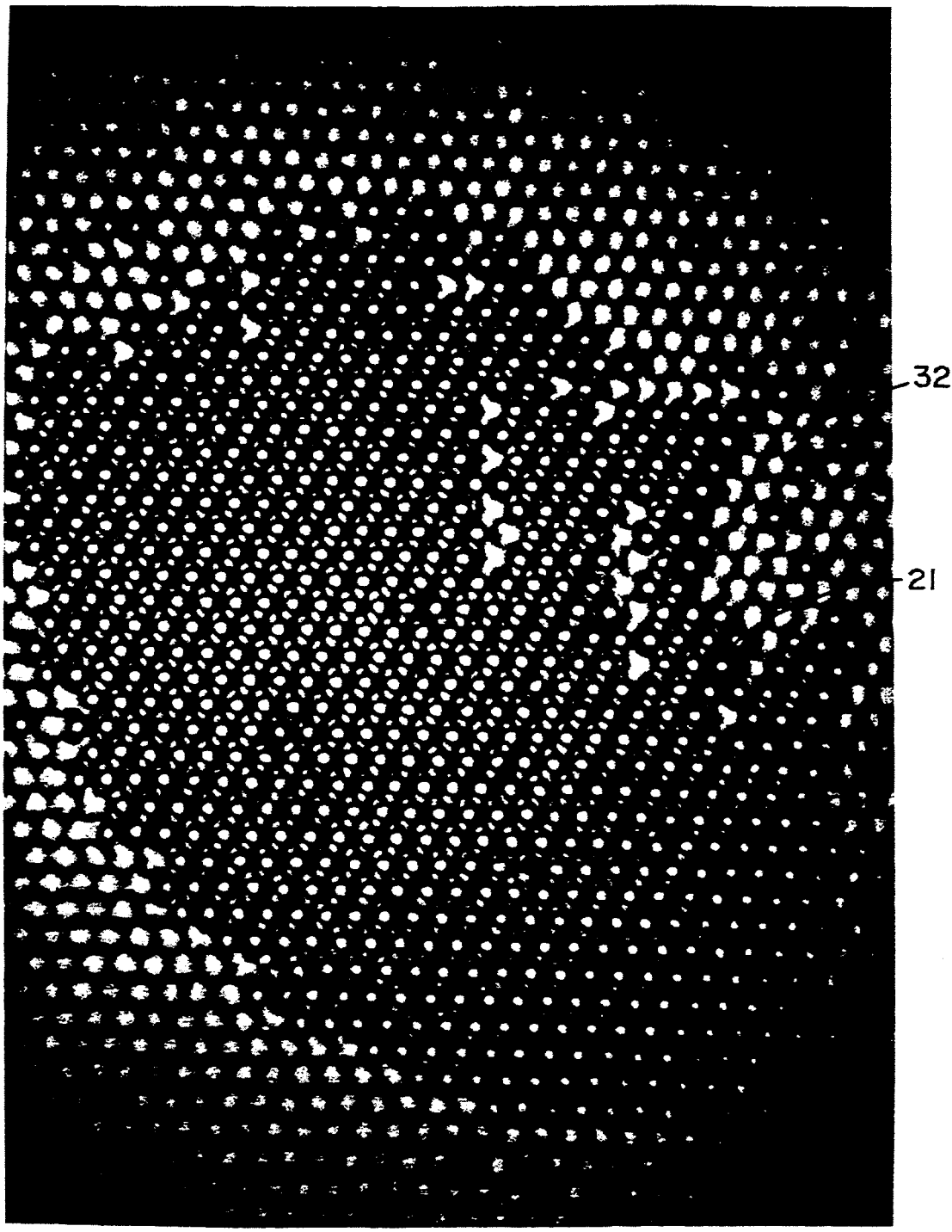
FIG. 6 shows spheres (3.4 micron diameter) distributed by the gradient force in the intensity pattern of FIG. 3.
Figure 7:
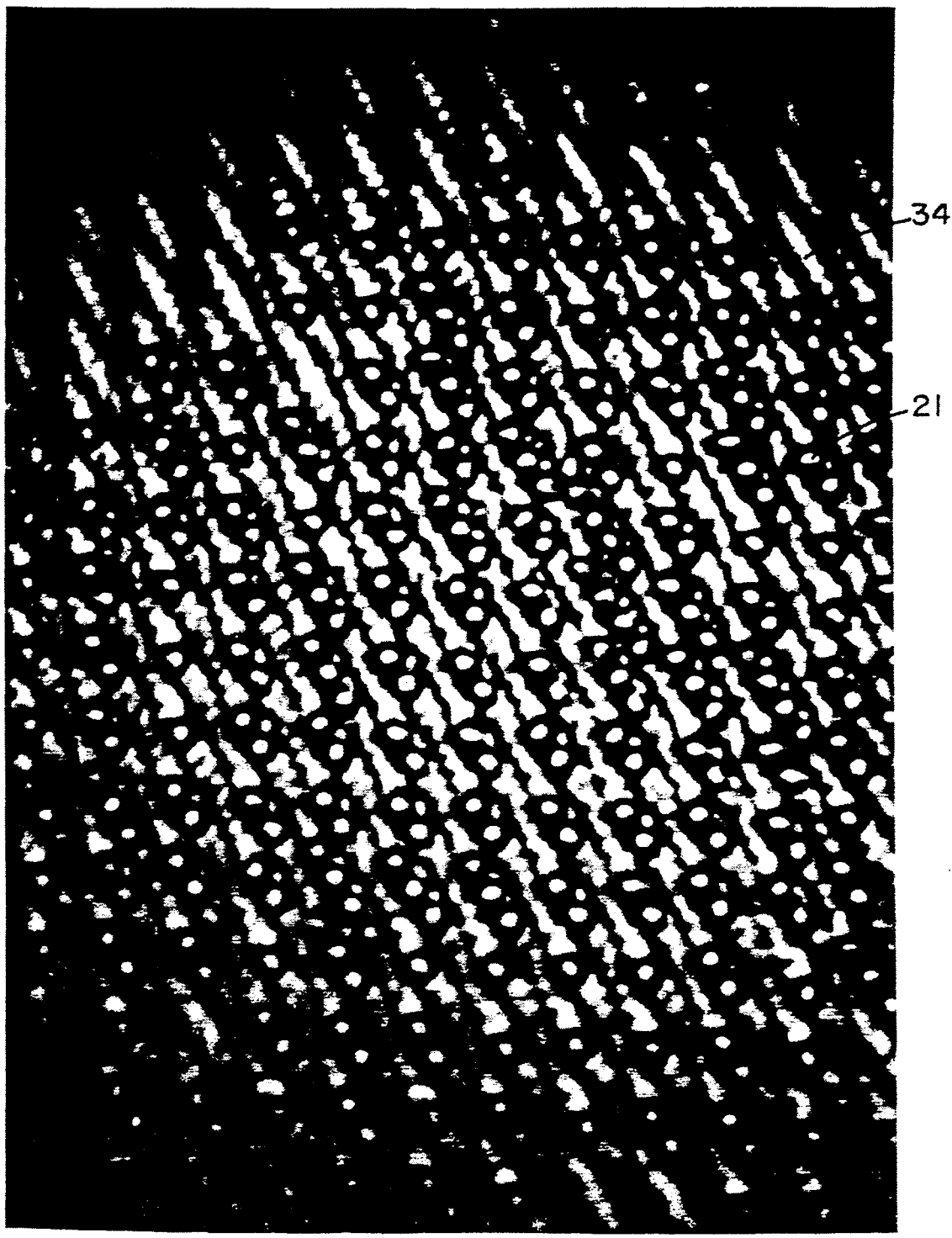
FIG. 7 shows spheres (3.4 micron diameter) distributed by the gradient force in the intensity pattern of FIG. 4.

FIGS. 5, 6, and 7 show images of two dimensional lattices of microscopic spheres of the same size formed in the standing wave configurations of FIGS. 2, 3, and 4, respectively. The intensity maxima are clearly seen to act as a periodic array of optical traps. Spheres 21 are in the various wells and make no transitions between them unless the optical intensity is much reduced. It is, however, still possible to observe fluctuations of the sphere positions due to thermally induced Brownian motion normally expected for such small objects suspended in a viscous fluid. The energy required to completely trap a sphere is just that required to overcome such thermal motion and hence depends on the temperature of the spheres and their surroundings.

In FIG. 5, spheres collect in long lines 30 somewhat randomly distributed along the well length. In FIG. 6, only a single sphere 21 fits in each of the symmetrically shaped periodic wells forming a single unit basis 32. Multi-unit bases can also be formed depending on well dimensions. Finally, in FIG. 7, more than one sphere 21 can fit in each well 34 and a more complicated multi-unit crystal basis can be formed.

It is possible to exercise additional control over the optical crystals demonstrated in FIGS. 5, 6, and 7, for example, by jiggling the cell relative to the optical field so that hydrodynamic Stokes forces also act on the spheres. In this way, large rafts of nearly defect free optical crystals are created and annealed at the back of the cell. Several particles of the same size, or of different sizes, can be trapped in a single cell.

Crystals with periodicity perpendicular to the cell face can be induced by sending the light through the rear surface into the cell.

Figure 8:
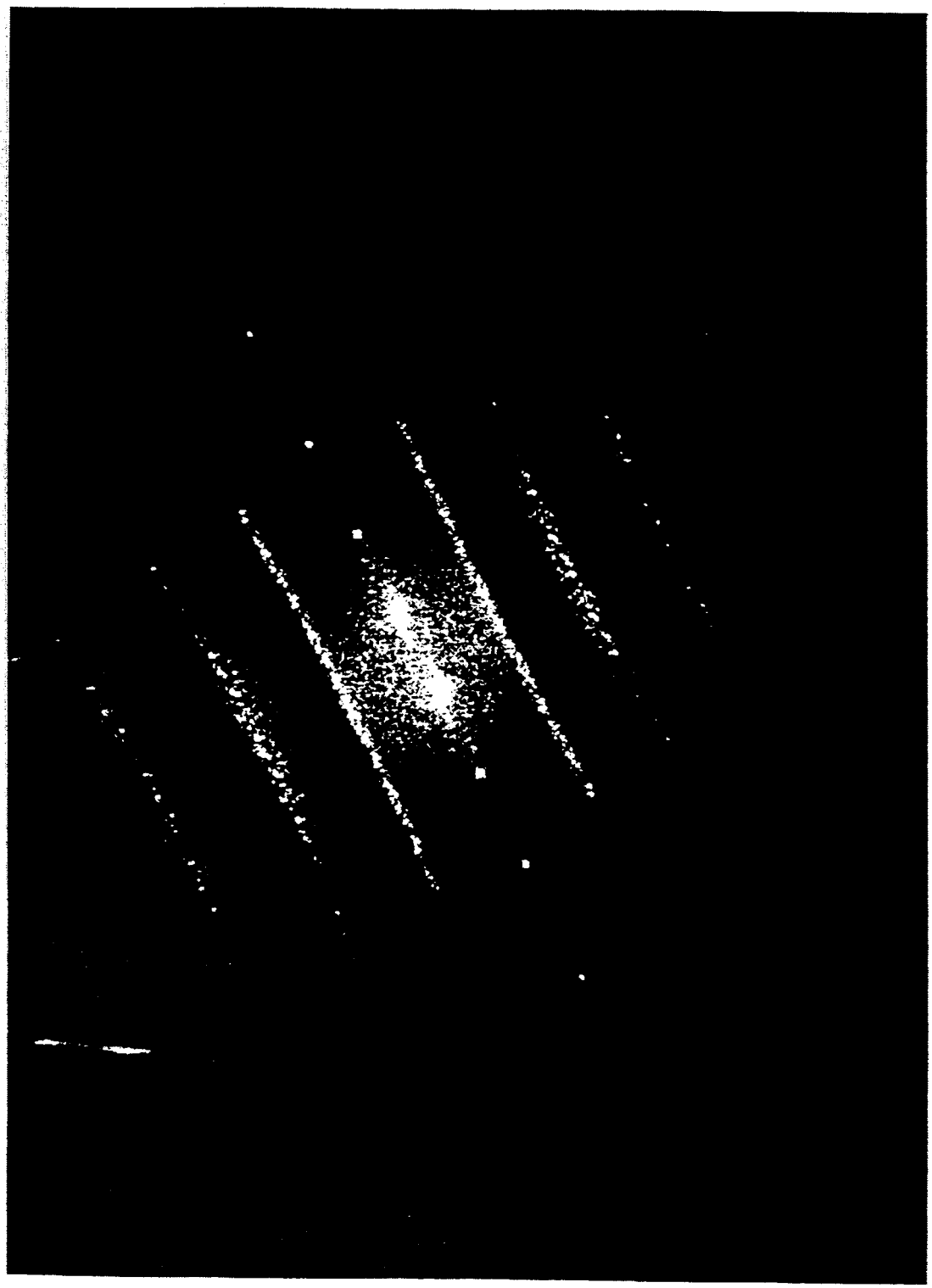
FIG. 8 shows a diffraction pattern formed by an array of spheres in FIG. 5.
Figure 9:
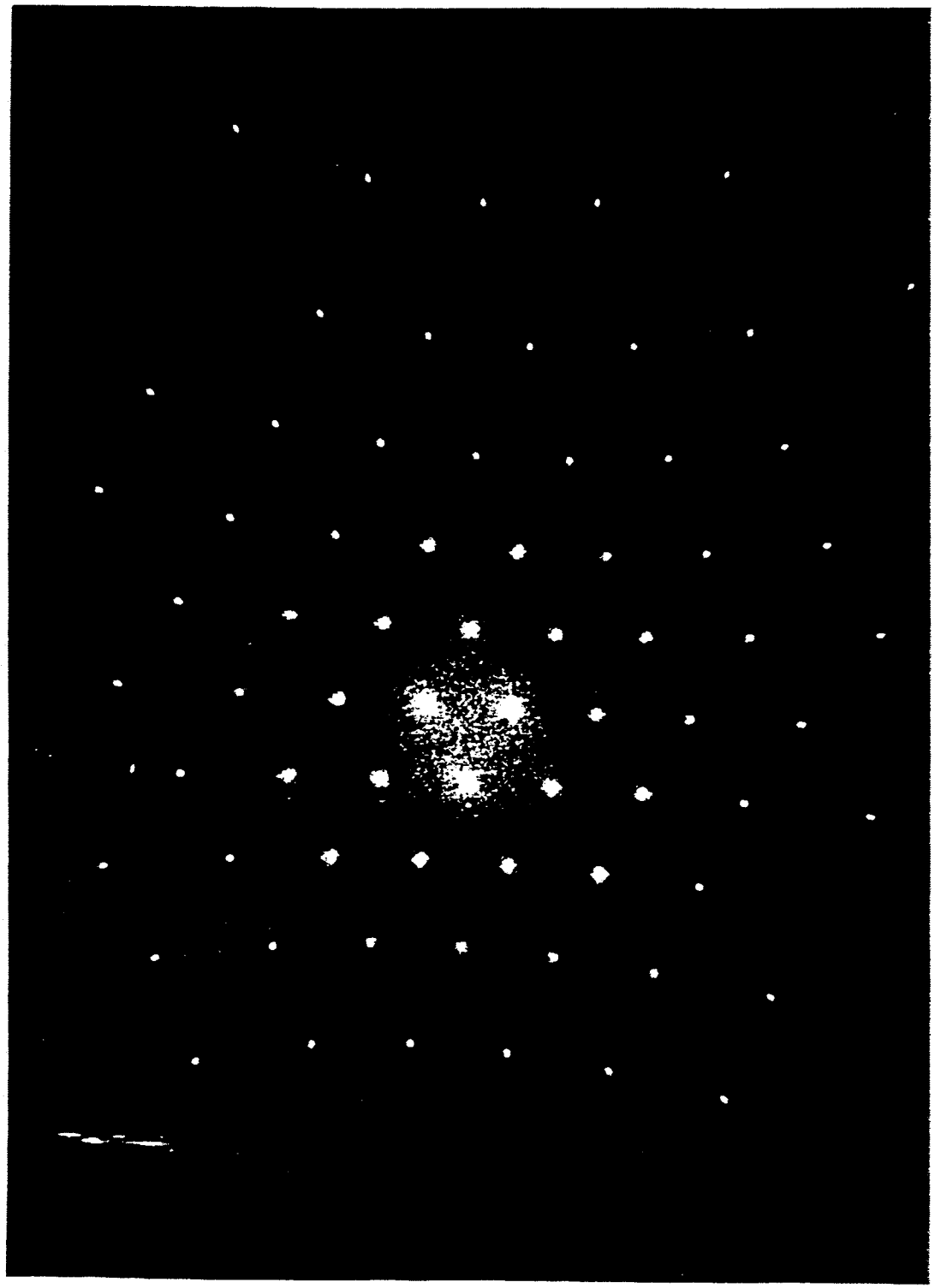
FIG. 9 shows a diffraction pattern formed by an array of spheres in FIG. 6.
Figure 10:
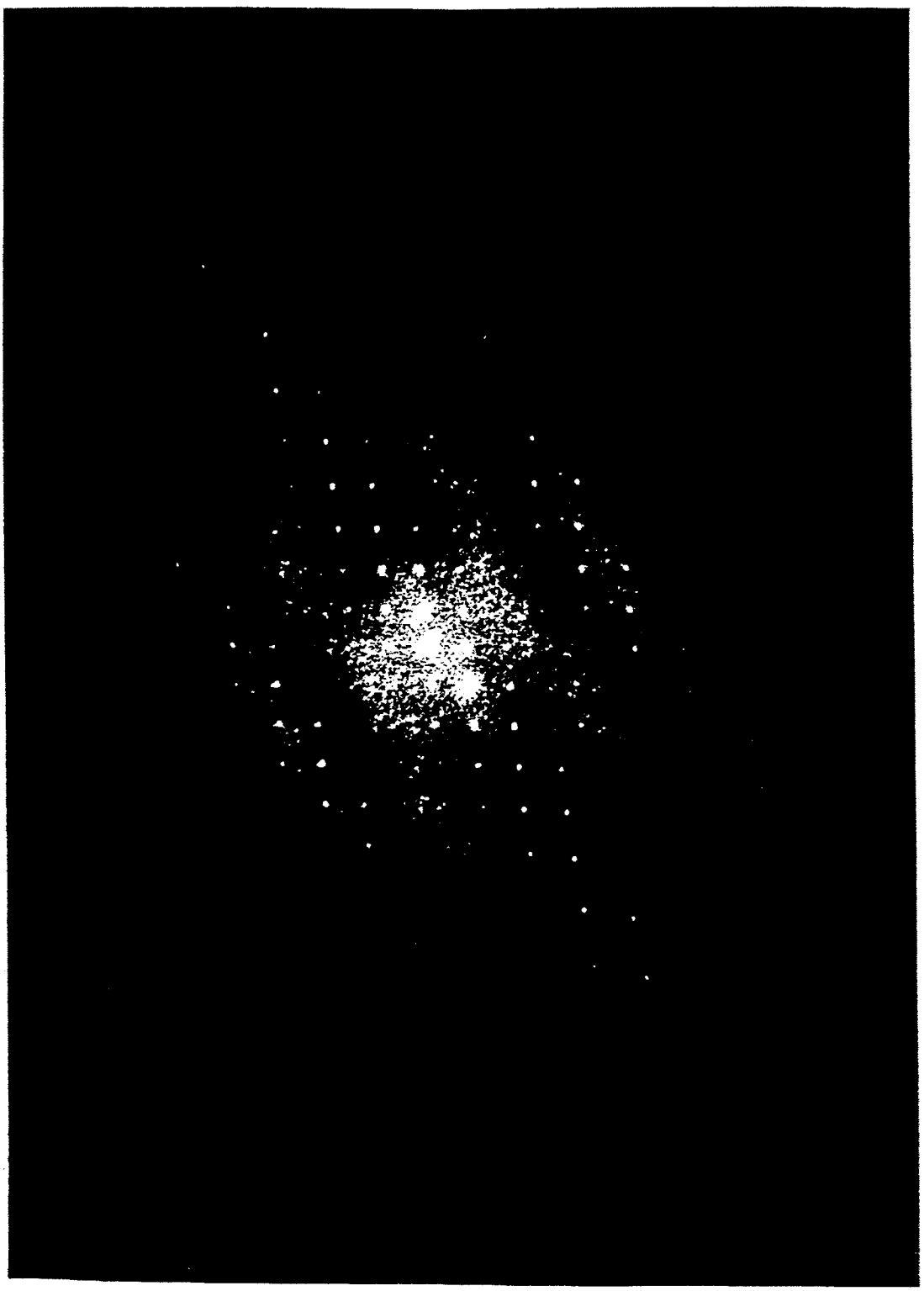
FIG. 10 shows a diffraction pattern formed by an array of spheres in FIG. 7.

FIGS. 8, 9, and 10 show the diffraction patterns obtained from the spheres organized by the three standing wave configurations of FIGS. 2, 3 and 4, respectively. FIG. 8 shows the diffraction pattern expected of a two dimensional crystal melted along the direction perpendicular to the plane of the two incident light beams, but highly ordered otherwise. In FIG. 9, all of the disorder connected with the melted direction has disappeared and a two dimensional diffraction pattern of sharp spots is obtained. Finally, FIG. 10 shows the pattern obtained for the more complex crystal that contains multiple spheres in a crystal unit cell.

Figure 11:
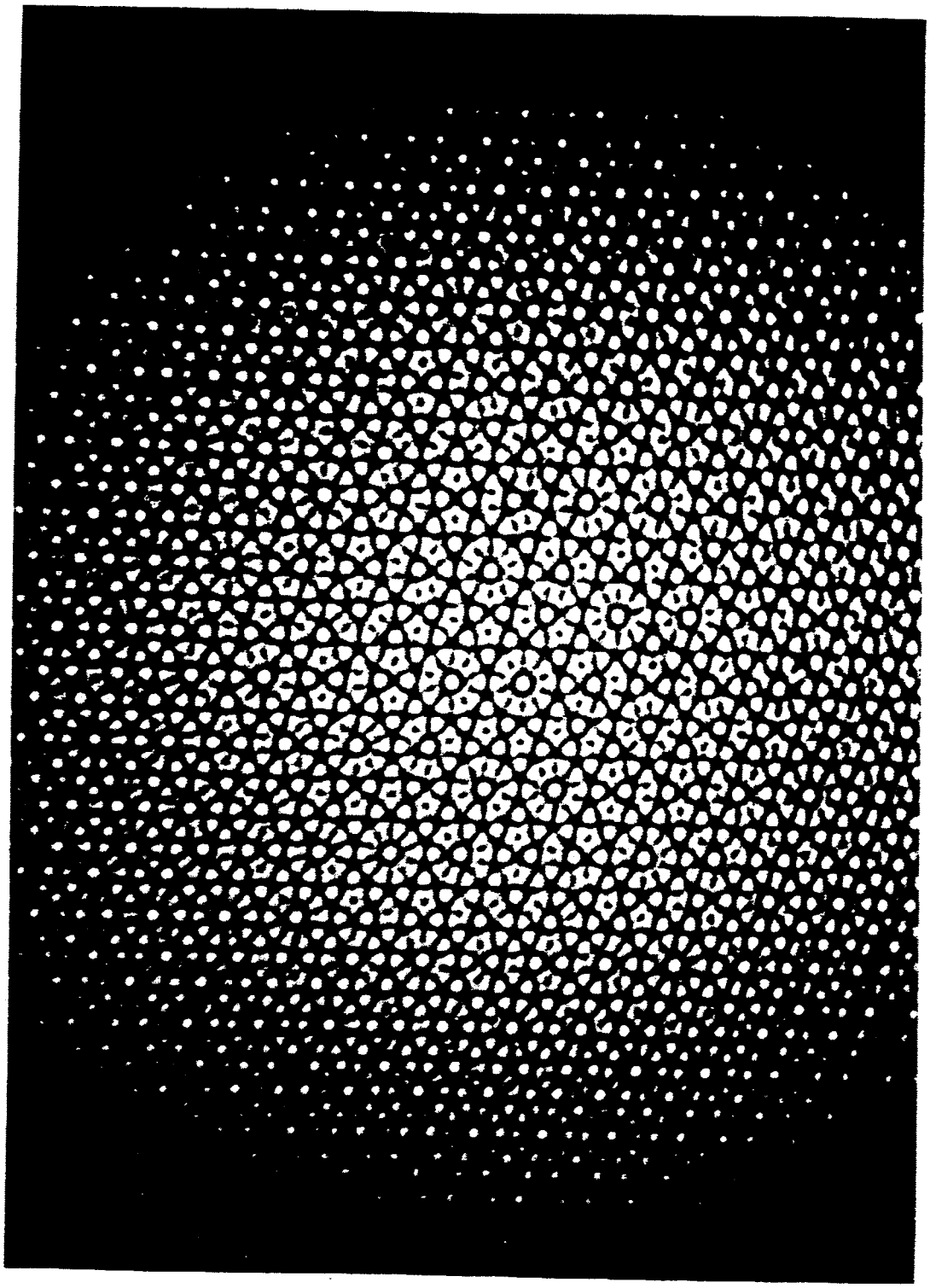
FIG. 11 shows an intensity pattern formed by five equiangularly incident beams.
Figure 12:
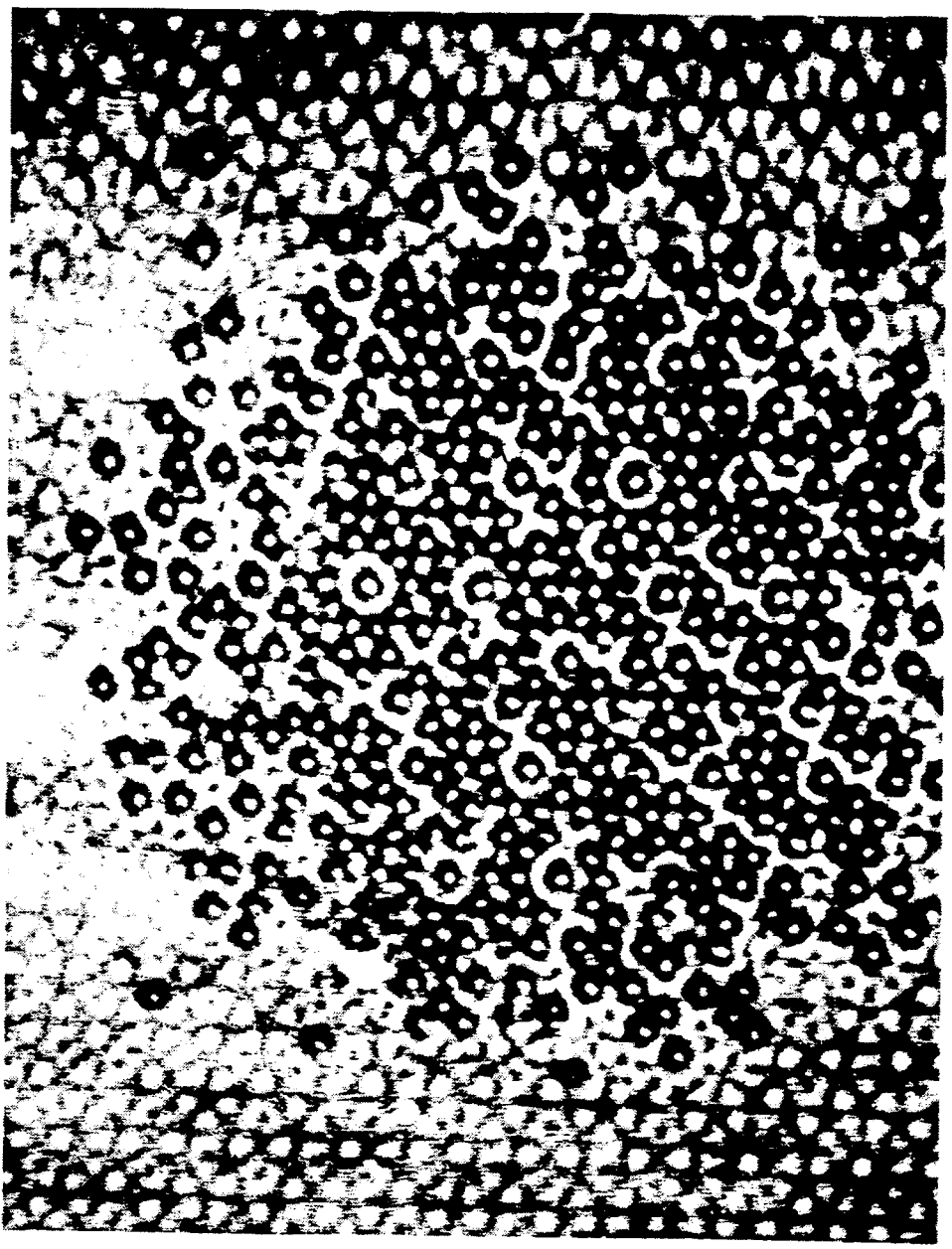
FIG. 12 shows a "quasicrystal" sphere assembly which results from the intensity pattern of FIG. 11.
Figure 13:
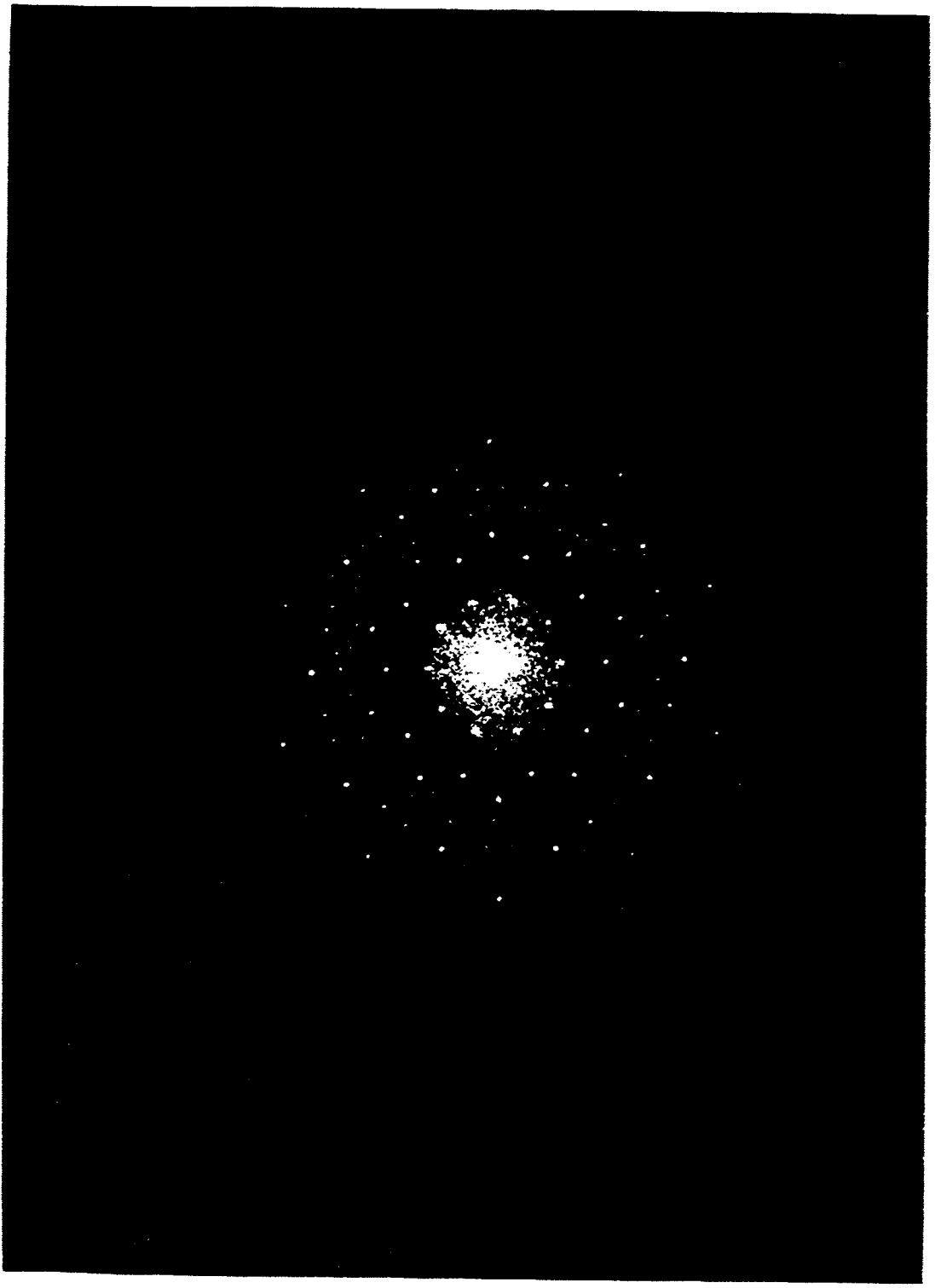
FIG. 13 shows a diffraction pattern corresponding to the FIG. 12 sphere assembly.

The standing wave pattern formed by five equiangular coherent beams yields a two dimensional array, which organizes the spheres into a "quasicrystal" (The Physics of Quasicrystals, P. J. Steinhardt, S. Ostlund eds, World Scientific, Singapore, 1987). FIG. 11 shows the standing wave pattern formed by the five beams 12 on the top face of cell 18. FIG. 12 shows the array of spheres organized in the standing wave pattern of FIG. 10, and FIG. 13 shows the diffraction pattern for that array. This pattern has been taken from the scattering of a single additional helium neon laser beam to clearly isolate the expected quasicrystal diffraction spots, since a pattern obtained from the argon ion laser beams would be complicated by the superposition of five diffraction pictures.

Another method of using light to organize matter takes advantage of the binding force between elements of matter that scatter the incident light. The mutual interaction of the matter with the incident and scattered field gives rise to mutual forces that can result in organized structures.

With only a single gaussian beam focussed on the sample cell, a single large potential well was created. When spheres were added, one by one, to this large potential well, a close packed crystal composed of spheres began to appear approximately concentric with the beam spot. After a few tens of spheres collected, strange crystal faceting and motion of individual spheres was noted as they first hit the top surface of cell 18 near the periphery and then moved towards the central close packed crystal. Individual spheres were not only being influenced by the incident beam but also by the beam scattered by the central crystal.

The energy of interaction of two coherently optically induced dipole moments has the interesting and curious feature of depending on separation as only the inverse power of separation, multiplied by an oscillatory factor such that the induced force between the dipoles changes sign every half wavelength of the exciting radiation field. It follows that such an interaction should result in the existence of optically induced, self organized bound states of the two dipoles with stable separations every wavelength at the positions where the induced force is zero and the interaction energy a minimum.

Figure 14:
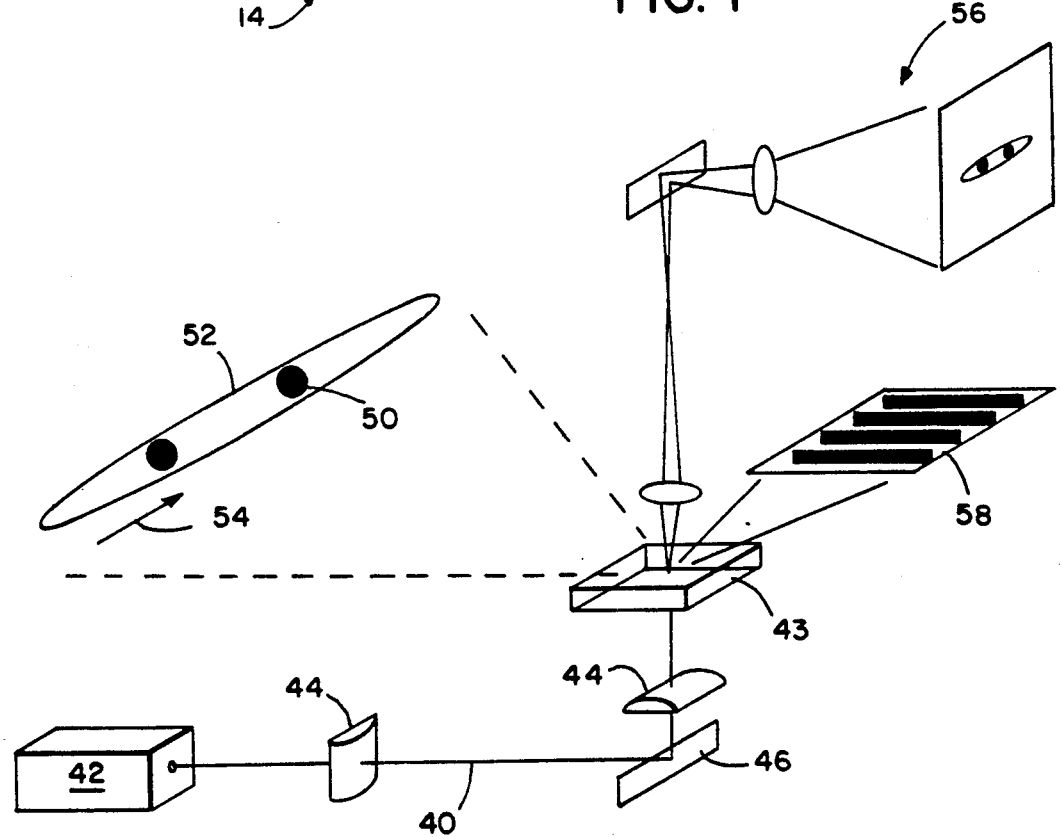
FIG. 14 shows an apparatus for optical binding.

A preferred embodiment for the generation of this force is shown in FIG. 14. Single beam 40 from an argon ion laser 42 delivering up to 10 watts of power at a wavelength of 5145Å is incident on cell 43. Cylindrical lenses 44 and folding mirror 46 insure that the incident beam is a narrow ribbon at the back of sample cell 43. The electric field vector is perpendicular to the long orientation of the ribbon. At the back of cell 43, beam dimensions are roughly 5 microns across by several hundred microns long. Spheres 50 are captured into long, skinny trap 52 within cell 43. Once captured, individual spheres 50 can still move freely along the direction given by arrow 54. Sphere concentration in solution is chosen so that two spheres are trapped which can then be observed undisturbed over a considerable period of time. Spheres may be observed both in projection microscope apparatus 56 and on diffraction screen 58.

Figure 15:
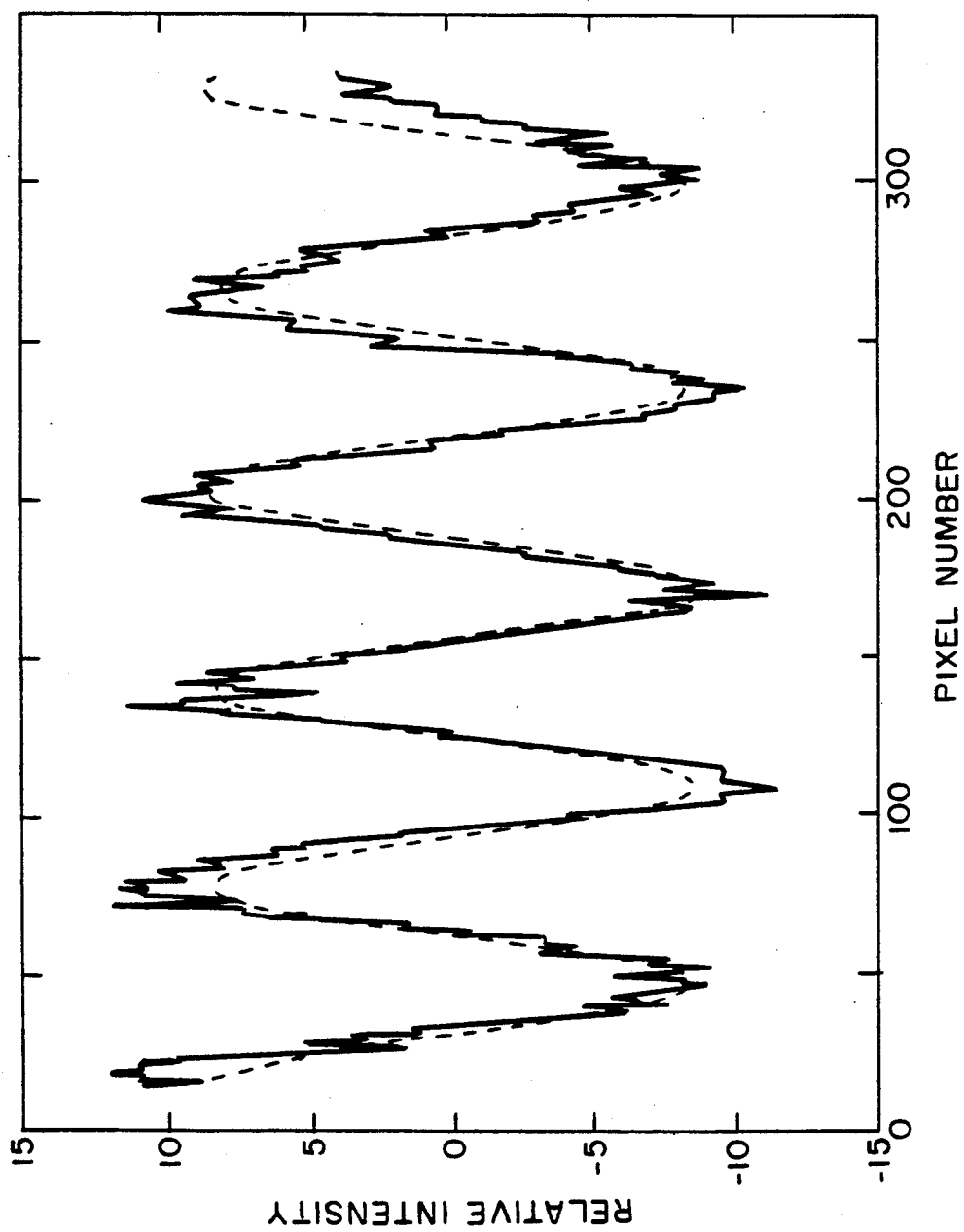
FIG. 15 shows a cross-section through an intensity diffraction pattern for an interacting sphere pair with superimposed dotted line computer fit.

When spheres 50 are well separated in trap 52, their motion appears random along the trap length, dominated by the diffusive, fluctuating trajectories characteristic of Brownian motion in a dissipative fluid. Trapped sphere 50 relative motion can be monitored by observing diffraction screen 58. The two spheres are seen to approach and spend considerable time in close proximity. FIG. 15, data extracted from one frame of a video tape of diffraction screen 58, shows the trajectory of spheres 50. The recording provides diffraction pictures every thirtieth of a second from which the sphere separation and trajectory can be calculated to an accuracy of a few hundred Angstroms.

Figure 16:
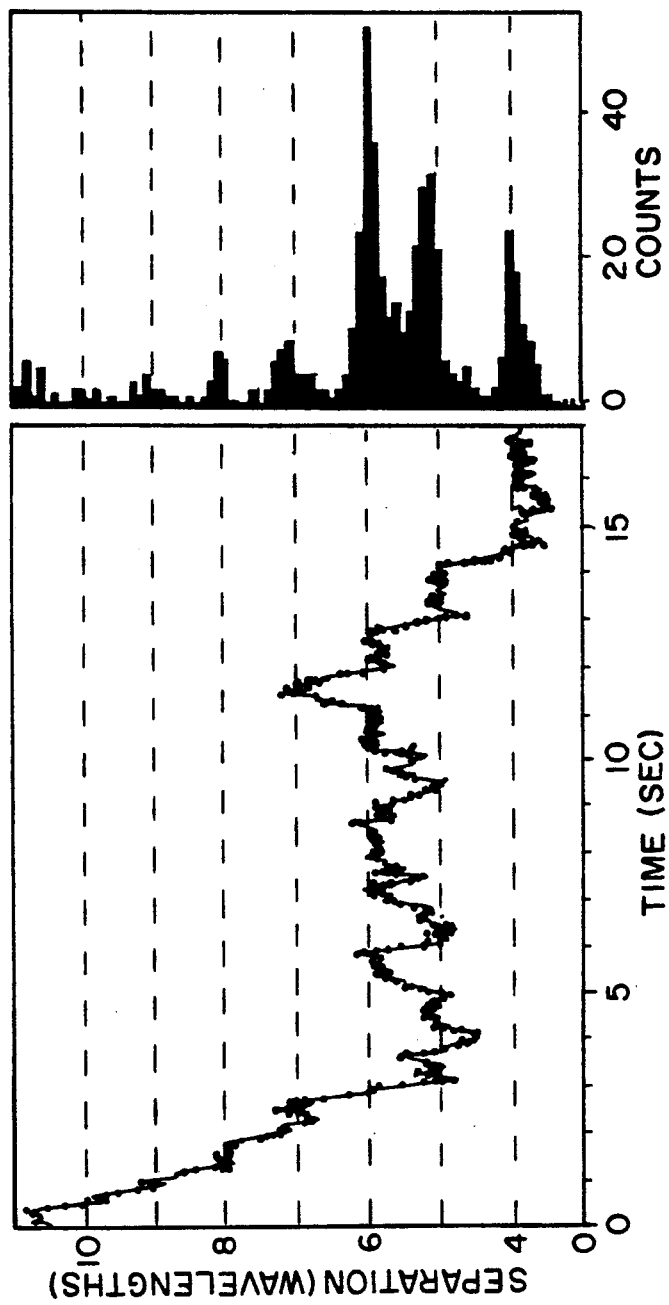
FIG. 16 shows relative separation as a function of time of two 1.43 micron diameter spheres measured in units of wavelength of illuminating light in water. The left plot shows the temporal evolution of sphere separation, sampled at 1/30 second intervals, and the right plot is the corresponding histogram.

FIG. 16 shows the time development of the relative separation deduced in this way for 1.43 micron diameter spheres at the middle of the trap. The motion still exhibits random character due to Brownian motion; however, there is distinctly enhanced probability that the spheres be found at discreet distances varying by the wavelength of the illuminating light. The histogram projected on the right hand side of FIG. 16 shows a peak at twice the sphere radius. The trajectory looks like that of a particle exhibiting fluctuating Brownian motion in a potential with periodic wells. The closest approach at about 3.8 wavelengths (1.43 μm) is in fact the separation for two spheres in contact. Higher laser power would mean a stronger trapping force and, assuming no additional thermal heating, longer dwell times near each minimum of the potential. The laser power was chosen so the system hopped between many different wells during the time window of an experimental run.

A simplified model in which an incident plane wave falls on a pair of optical scatterers, completely characterized by their dipole moment polarizabilities explains this effect. The coupled Maxwell-Lorentz-Newton equations (using the dipole approximation) for the self consistent time dependent dipole moments induced by the total optical field (both incident and scattered components) and the resulting interaction between the dipoles as a function of their separation quantitatively model the effect. Alternatively, the system is stable (without hopping) at lower temperatures.

The physical origins of the optical binding forces are seen as the result of a time averaged magnetic force from retarded radiation field current-current interactions. From the standpoint of an individual dipole, the forces originate from an interaction of the internal oscillator current with the light scattered from the neighboring dipole. The exchange of light energy between scattering dipoles is seen to play a crucial role in the development of binding forces. Indeed, the retardation between this scattered magnetic field and internal oscillator current allows a form of internal radiation pressure to develop whose sign depends on the separation of the dipoles. This sign variation with separation causes binding of scatterers.

Quantitatively the above model predicts a potential energy of interaction given by M. M. Burns, et al., Phys. Rev. Lett. 63, 1233 (1989)

$$W = -\frac{1}{2} \alpha^2 \left(\frac{2\pi}{\lambda}\right)^2 E^2 \cos\left(\frac{2\pi r}{\lambda}\right)/r + O\left(\frac{1}{r^2}\right) \quad (7)$$

The positions of minimum energy predicted by equation 7 are mostly at sphere separations, $r = n\lambda$ the preferred system configuration according to the histogram in FIG. 16.

Although the system of this preferred embodiment does not consist of exactly point dipoles, the overall features contained in equation 7 should be retained by more exact calculations. Those features that must remain are the periodic bound state positions, the long range of the interaction and the curious fact that the resultant time averaged forces are not screened out even by a high D.C. conductivity of the fluid wherein the interacting matter is dispersed.

Figure 17:
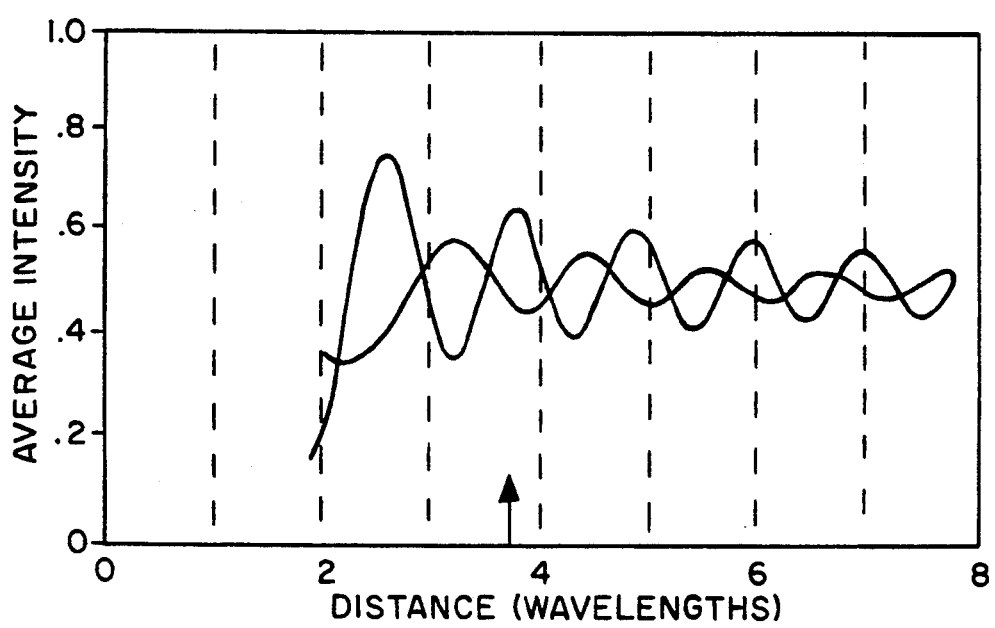
FIG. 17 shows results of Mie calculations of the time-average intensity of the near fields of 1.43 and 1.53 μm spheres.

It is possible to enhance these forces by proper choice of sphere size to take advantage of geometric scattering-resonance phenomena. FIG. 17 demonstrates the sensitivity of binding well depths to the sphere size relative to the wavelenth of light in the Mie regime.

Light beams may thus determine the organization of matter by trapping and binding particles, thus creating a new form of matter, "optical matter", organized and held together by photons. The forces generated by the light are quite different than those generated by electrons in ordinary "electronic matter" organized and held together by electron exchange. For example, these optical forces can be both extraordinarily long range, and periodic in space.

Optically induced interaction forces are amenable to continuous external intensity and geometry control, resulting in great diversity in the types of "optical matter" possible. Optical matter can be designed and engineered into structures exploiting these new degrees of freedom. Any imaging optical system is capable of modifying the intensity distribution of a beam of light. Binary optics components (G. J. Swanson, W. B. Veldkamp, Opt. Eng. 28, 605, 1989; J. R. Leger, et al., Appl. Opt. 26, 4391, 1987) can be used to create arbitrary intensity patterns to serve as templates of organization. In addition, the scattered light between the constituents contributes its own organizing force. With only a single unstructured incident beam, systems can organize themselves into structures whose details will depend on the character as well as number of scatterers.

Intense light beams can modify the average refractive index of materials by changing the concentration of matter. This effect can act simultaneously with the organization of matter generated by directing intense light beams onto it.

A photonic semiconductor is a material which exhibits a photonic bandgap, an energy range where optical modes, spontaneous emission and zero point fluctuations are absent. Spherical or non-spherical particles of any material are dispersed in a medium selected so that a refractive index differential exists between the matter and dispersing medium. High refractive index materials such as glass or diamond result in better trapping and, consequently, higher bandgaps. Like electron waves in crystals, light waves in three dimensionally periodic dielectric structures can be described by band theory and their behavior in quantum electronic applications such as spontaneous-emission inhibition predicted.

What is claimed is:

1. A method for organizing matter comprising:
   providing mobile, polarizable matter; and
   applying coherent light having an intensity pattern produced by multiple light beams to said matter, whereby the light intensity pattern generates forces on said matter, thereby causing the matter to adopt an organized configuration having a pattern determined substantially only by said light intensity pattern.

2. A method for binding matter comprising:
   providing mobile, polarizable matter; and
   applying coherent light to said matter which scatters light, whereby light scattered by the matter itself generates forces within said matter, said forces causing the matter to adopt a stable, bound configuration.

3. A method for organizing matter in a selected pattern comprising:
   providing mobile, polarizable matter; and
   directing multiple coherent light beams on said matter to generate a light intensity pattern, whereby the light intensity pattern, in conjunction with light scattered by the matter itself, generates forces on and within said matter, said forces causing the matter to organize into a stable, bound configuration.

4. The method of claim 1, 2 or 3 wherein said matter comprises discrete particles in a fluid medium having a refractive index different from the refractive indices of the particles.

5. The method of claim 4 wherein said array is made permanent by changing the temperature or chemistry to solidify said medium.

6. The method of claim 1, 2 or 3 wherein said matter is a dielectric.

7. The method of claim 1, 2 or 3 wherein said matter is a semiconductor.

8. The method of claim 1, 2 or 3 wherein said matter is a metal.

9. The method of claim 1, 2 or 3 wherein said matter is a molecule.

10. The method of claim 1, 2 or 3 wherein said matter is an atom.

11. The method of claim 1, 2 or 3 wherein said matter is biological in origin.

12. The method of claim 1, 2 or 3 wherein said matter consists of spherical particles.

13. The method of claim 12 wherein said particles consist of plastic spheres.

14. The method of claim 1, 2 or 3 wherein said matter consists of non-spherical particles.

15. The method of claim 14 wherein said non-spherical particles are oriented.

16. The method of claim 1, 2 or 3 further comprising use of processes that condense the oriented matter into more highly ordered materials than occur naturally.

17. The method of claim 1 or 3 wherein the multiplicity of said light beams is three and the array is periodic.

18. The method of claim 1 or 3 wherein the multiplicity of said light beams is five and the array is aperiodic with local five-fold symmetry.

19. The method of claim 1, 2 or 3 wherein said light beams are generated by a laser.

20. The method of claim 1, 2 or 3 wherein said laser radiation is in the infrared range of the spectrum.

21. The method of claim 19 wherein said laser is a dye, gas, diode or solid state laser.

22. The method of claim 1, 2 or 3 wherein said array is made permanent.

23. The method of claim 1 or 3 wherein said light beams are equiangularly incident on said matter.

24. The method of claim 1 or 3 wherein said light beams are not equiangularly incident on said matter.

25. The method of claim 1 or 3 wherein the intensities, polarizations, focal properties and mutual phases of said light beams are carefully chosen to give the desired organizing pattern.

26. The method of claim 1 or 3 wherein an array of a selected symmetry is produced by choosing the appropriate number and geometry of said light beams.

27. The method of claim 1 or 3 wherein said array has a multi-unit basis.

28. An apparatus for inducing crystallization of mobile, polarizable matter in optical standing waves comprising a laser producing a laser beam in combination with an arrangement of mirrors and lenses for splitting said laser beam into multiple beams and for bringing said multiple beams to a common focus on a sample cell which contains mobile, polarizable matter to generate an optical standing wave pattern in said sample cell, whereby said optical standing wave pattern generates forces on said matter, thereby causing the matter to adopt an organized configuration having a pattern determined substantially only by said light intensity pattern.

29. An apparatus for binding mobile, polarizable matter comprising a laser producing a laser beam in combination with a set of mirrors and lenses for focussing said laser beam on a sample cell which contains mobile, polarizable matter, whereby light scattered by the matter itself generates forces within said matter, said forces causing the matter to bind into a stable configuration.

30. The apparatus of claim 28 or 29 wherein said matter to be organized is a suspension of micron size plastic spheres in water.

31. The apparatus of claim 28 or 29 further comprising optics for projecting an image of the organized matter on a screen for viewing or photographing.

32. The apparatus of claim 28 or 29 further comprising a screen for viewing diffraction spots from the organized matter.

33. The method of claim 1, 2, or 3 wherein said matter is affected by non-linear effects generated by the light.

34. The method of claim 1, 2, or 3 wherein clusters of particles are assembled at maxima in the light intensity pattern.

35. The method of claim 1, 2, or 3, further comprising making said configuration permanent to form a mechanical filter.

36. The method of claim 35 wherein said configuration has dimensions suitable for filtering biological organisms.

37. The method of claim 1, 2, or 3, wherein said configuration forms an optical filter.

38. The method of claim 37, further comprising making said configuration permanent.

39. The method claim 37, further comprising varying said configuration by changing beam angles or wavelengths to tune said optical filter.

40. The method of claim 1, 2, or 3, wherein said matter is fluorescent and wherein said light pumps said matter to form a Bragg laser.

41. The method of claim 1, 2, or 3, further comprising making said configuration permanent to form an epitaxy template.

42. The method of claim 41, wherein said template is used for epitaxy of a semiconductor.

43. The method of claim 41, wherein said template is used for epitaxy of a superconductor.

44. The method of claim 1, 2, or 3, further comprising making said configuration into a material which exhibits an optical bandgap to form a photonic semiconductor.

45. The method of claim 1, 2, or 3, wherein said matter comprises light scattering particles, whereby said configuration forms an optical component.

46. The method of claim 45 wherein said optical component is a hologram, a diffractive optical element, or an optical phase plate.

47. The method of claim 45, further comprising controlling the size and location of said scattering particles.

48. The method of claim 45, wherein said particles are selected for their optical indices and for their low size dispersion, further comprising controlling the location of said scattering particles.

49. The method of claim 1, 2, or 3, wherein said light is produced by an array of lasers and wherein said configuration causes said lasers to assume defined relative radiating phases, thereby phase locking said array of lasers.

50. The method of claim 1, 2, or 3, wherein said matter comprises living biological cells, and wherein said configuration provides a two dimensional membrane of said cells, further comprising retaining said configuration in a permanent form by a natural or stimulated biological process.

* * * * *